Dec. 1, 1936. O. C. ABBOTT ET AL 2,062,437
CONTROL SYSTEM HAVING STABILIZING AND ANTICIPATORY FEATURES
Filed Sept. 14, 1935 2 Sheets-Sheet 1
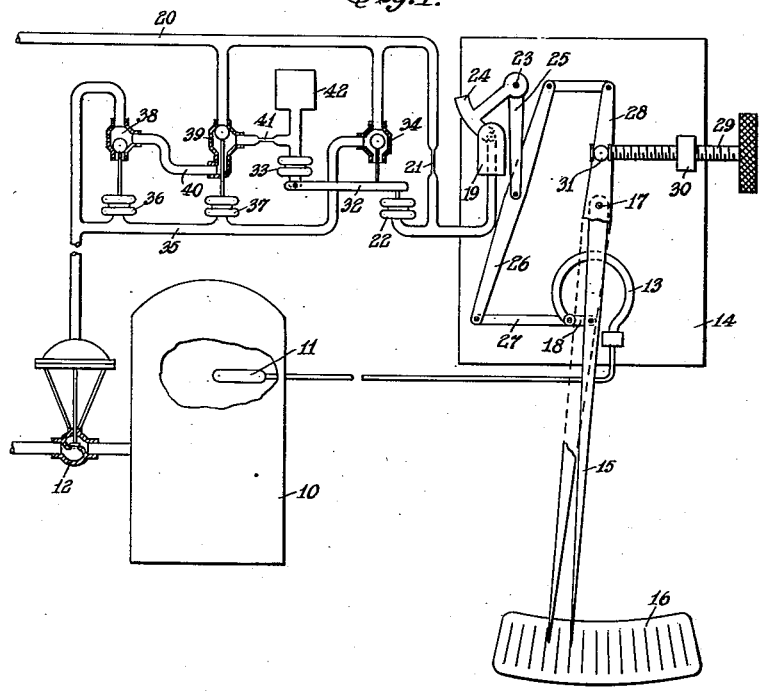
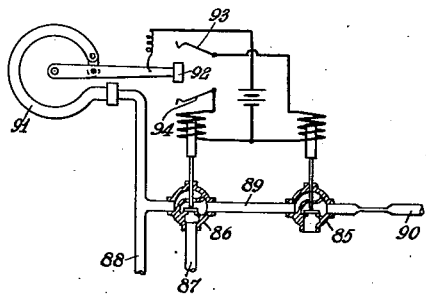
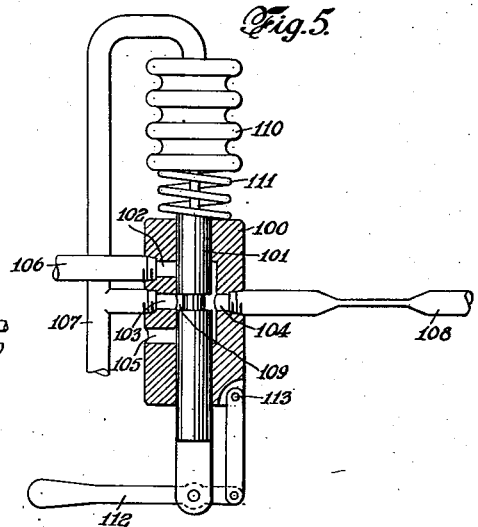
INVENTORS
OWEN C. ABBOTT AND FRED A. FAUS
BY
ATTORNEY.

Dec. 1, 1936.  O. C. ABBOTT ET AL  2,062,437
CONTROL SYSTEM HAVING STABILIZING AND ANTICIPATORY FEATURES
Filed Sept. 14, 1935   2 Sheets-Sheet 2

INVENTORS
OWEN C. ABBOTT AND FRED A. FAUST
BY
ATTORNEY.

Patented Dec. 1, 1936

2,062,437

UNITED STATES PATENT OFFICE 2,062,437

CONTROL SYSTEM HAVING STABILIZING AND ANTICIPATORY FEATURES

Owen C. Abbott and Fred A. Faust, Waterbury, Conn., assignors to The Bristol Company, Waterbury, Conn., a corporation of Connecticut Application September 14, 1935, Serial No. 40,538

16 Claims. (Cl. 236—82)

The invention relates to control mechanisms and more particularly to automatic control systems of the type in which a variable condition is regulated to a predetermined magnitude through the agency of an expansible fluid, such as air, acting upon a pressure-actuated valve, the fluid in turn being controlled by a movable member responsive to changes in the magnitude of the condition to be controlled. It is a well-known fact that systems of this type may be designed and adjusted to provide control with a high degree of precision at some one selected point, so long as the demands for the magnitude-controlling agent are not subject to extreme variations. It is found, however, that a system of this nature, adjusted to maintain an equilibrium at one selected point, will be subject to oscillations unless material adjustments are made when it is required that control be effected at another selected magnitude. Moreover, when extreme and sudden variations in demand for the magnitude-controlling agent are encountered, any modifications tending toward automatic stabilization work to delay the action of the control to an extent that an undesirable time lag may be introduced in the performance of the control.

It is an object of the invention to provide a control of the class described, in which a stabilizing element tends to maintain a state of equilibrium of the control system throughout a wide range of operating conditions.

It is a further object to provide means whereby, under conditions of extreme variation of the controlled magnitude, the stabilizing elements of the control will be actuated, in a sense reverse from their normal actuation, to superimpose a restoring characteristic in the performance of the system.

In carrying out the invention, there is associated with the primary control mechanism a secondary and tertiary system of which the former exerts an influence thereon tending to modify within moderate limits of variation the performance of said primary control mechanism, while the latter effects under variations beyond said limits an influence the reverse of that exerted by said secondary control system.

The nature of the invention, however, will best be understood when described in connection with the accompanying drawings, in which:

Fig. 1 is a diagrammatic representation of a preferred form of control system embodying the features of the invention.

Fig. 4 is a diagrammatic view of a part of a system, alternatively applicable to any one of the above embodiments, wherein certain functions are accomplished by electrical means.

Fig. 5 is a drawing to an enlarged scale, partly in section, of a single piston valve which may be alternatively applied in any one of the three embodiments to replace two independent valves there shown.

Figure 2:
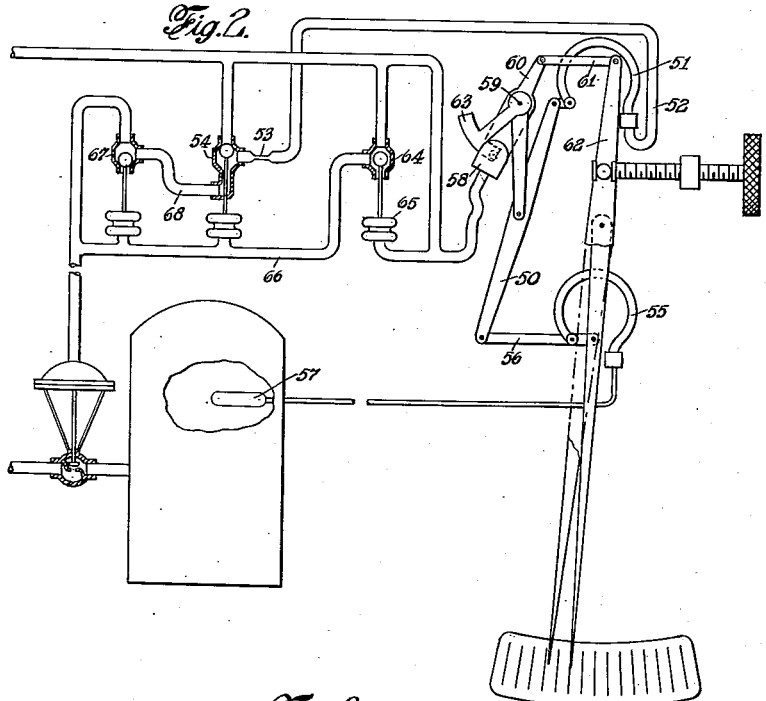
Fig. 2 is an alternative form.

Referring to the drawings, 10 designates a chamber in which it is desired to maintain a regulated temperature, as determined by a sensitive element 11, by the control of admission of a heating agent, such as steam, through a pneumatically actuated valve 12. The sensitive element 11 may be a "bulb", containing an expansible fluid, as, for example, xylene, and connected by a capillary tube to a pressure-sensitive member, such as a Bourdon spring 13 mounted upon a base-plate 14. An indicating pointer (or recording pen) 15, traversing a graduated scale 16, and freely pivoted about an axis 17 carried on the base-plate 14, is attached to the free end of the Bourdon spring 13 by means of a link 18, and provides on the scale 16 a measure of the temperature to which the bulb 11 is exposed.

A double-opposed orifice member 19, preferably of the type set forth in U. S. Letters Patent No. 1,880,247, granted October 4, 1932, to Griggs and Mabey, is fixed to the base plate 14 and is connected to a source 20 of air or other suitable fluid under the required pressure through a conduit having a constricted portion 21, which conduit is also in communication with an expansible bellows member 22. Swingable on the base plate 14 about an axis 23 is a thin vane or oscillatable element 24, having attached thereto a lever arm 25, by which it may be variably positioned between the jets of fluid issuing from the orifice member 19, thus controlling the escape of air therefrom to the atmosphere, and thereby regulating the back-pressure within the bellows member 22.

Carried by the lever arm 25 is a lever member 26 which is pivoted thereto at its middle point and has oppositely extended arms, thus constituting a differential lever. One extremity of the lever member 26 is attached to the Bourdon spring 13 by a link 27, and the other extremity is similarly linked to an extension of a setting pointer member 28. The latter is adjustable about the axis 17, and provides an indication of its adjusted position on the scale 16.

Adjustment of the pointer 28 is effected by a manually operable screw 29, threadedly engaging a block 30 pivotally mounted on the base plate 14, and rotating within a post 31 pivotally mounted on the pointer member 28. There is thus provided a micrometer adjustment of the setting pointer 28; and the parts of the system are so proportioned and positioned relatively that the cutting edge of the vane 24 will occupy an optimum position between the jets of the orifice member 19 when the pointers 28 and 15 have a common indication on the scale 16.

Operatively associated with the bellows member 22 is a lever member 32, fulcrumed on a support carried by a further bellows member 33, and, at a point intermediate its extremities, engaging the operating part of a three-way valve 34 of the supply-and-exhaust type. The valve 34 is connected to control a supply of air to an actuating fluid conduit 35 communicating with the actuating element of the control valve 12 in such a manner that with the seating member (ball) of the valve 34 in its lowest position, full line pressure from the source of air supply 20 will be supplied to the said valve 12. With the ball of the valve 34 in its topmost position, the supply will be shut off from the conduit 35 and its interior space vented to the atmosphere. Thus, the pressure upon, and consequently the opening of, the valve 12 will be subject to the position of the valve 34; and, this (assuming for the moment the fulcrum of the lever 32 to be stationary) to the position of the vane 24. The position of the vane being subject through the differential lever 26 to the joint action of the pointer elements 15 and 28, there is provided in the device set forth above an automatic control substantially equivalent to that set forth in U. S. Letters Patent No. 2,000,739, granted May 7, 1935, to Bristol and Borden.

In communication with the conduit 35 are two bellows members 36 and 37, operatively associated with three-way valves 38 and 39 respectively. Valve 38, of the supply-and-waste type, serves to place a conduit 40 in communication with either the conduit 35 or with the atmosphere. This valve is so adjusted that within the range of pressures existing in the conduit 35 under normal operating conditions, the outlet to the atmosphere will be closed and conduit 40 be placed in direct communication with conduit 35. Upon pressure in conduit 35 rising above the predetermined limit, the valve 38 will be more or less abruptly actuated, and the conduit 40 placed directly in communication with the atmosphere.

Valve 39 serves to place the interior of bellows 33 in communication with either the conduit 40 or with the source of air supply 20; and it is so adjusted that, within the range of pressures existing in the conduit 35 under normal operating conditions, the bellows 33 will be in communication with conduit 40 and the connection to the air supply closed. Upon a decrease of pressure in the conduit 35 below a predetermined limit, this communication will be cut off and the bellows 33 will be connected directly to the supply. As examples of the relative pressure values at which the valves 38 and 39 are actuated, it has been found that with an air supply pressure of 15 lbs. per square inch, effective operation is obtained with the valve 38 resting against its lower seat, as shown in the diagram, as long as the pressure in the conduit 35 is less than 11 lbs., and against the upper seat when it exceeds 12 lbs; and the valve 39 against the upper seat so long as the pressure is above 4 lbs. and against the lower seat when the pressure is below 3 lbs. These critical values are purely relative and are subject to modification to meet varying conditions of control.

Between the bellows 33 and the valve 39 is interposed a section of conduit having a constricted bore, as at 41, this, combined with the internal volume of the bellows 33, serving to delay pressure changes in the bellows, as related to changes in pressure of the air from valve 39. A chamber 42 having additional capacity may be connected to the bellows 33 and also supplied through the constriction 41, thus further delaying the response of bellows 33 to pressure changes.

As hereinbefore set forth, while the fulcrum of the lever 32 is considered as stationary, the performance of the system will be equivalent to that disclosed in the aforementioned Letters Patent No. 2,000,739. With the fulcrum free to shift with changes in pressure in the bellows 22, there is introduced a "reset" feature, of which, while for said feature no invention is here claimed, a clear understanding is essential to full comprehension of the performance of the improved control system.

Assume the system to have reached a state of equilibrium, with pressure in the conduit 35 within the predetermined range (known as the "throttling range") and during which the valves 38 and 39 are maintained in the positions indicated in the drawings, and there then to occur a condition bringing about a lowering of temperature in the chamber 10 as measured by the sensitive element 11. This will cause a deflection of the free end of the Bourdon spring 13, the link 27, the lower arm of the lever 26, and the lever arm 25 toward the right in the drawings, the deflection also being indicated by an excursion of the pointer 15 over the scale 16. In response to movement of the lever arm 25, the vane 24 will be moved in a sense to close the orifices of member 19, and thus will bring about a building up of pressure in the bellows 22. This will immediately lift the right-hand end of lever 32, tending to close the valve 34 against its upper seat and restrict the air supply. At the same time, the vent area is increased, so that pressure in the conduit 35 will fall to a lower value, allowing the valve 12 to open and admit a greater quantity of the heating agent to the chamber 10. As thus far described, the control is normal and is well-known to the art, as exemplified in either of the patents hereinbefore noted.

If the pressure within the conduit 35 remains within the "throttling range" as hereinbefore set forth, the drop of pressure will be communicated through the valves 38 and 39 and the conduit 40 to the bellows 33; and, subject to a time-lag introduced by the constriction 41, will cause a deflection of said bellows in a sense to increase further the deflection of the valve 34 and further lower the pressure in conduit 35.

Now, in order to restore a condition of equilibrium in the control system with the ideal temperature maintaining at the bulb 11, and yet a demand for a greater flow of the heating agent through the valve 12, it is essential that the system come to equilibrium with the valve 12 in a more widely opened position than before, meaning a lower pressure in the conduit 35. The action of the bellows 33 in supplementing that of the bellows 22 and opening the valve 34 to a greater extent than originally due to the deflection of bellows 22, allows the bellows 22 to return to their original position, corresponding to the original, and ideal, temperature within the chamber 10, with a lower pressure in the conduit 35 and a consequent greater opening of the valve 12.

In a similar manner, a decrease in the demand for heating agent in the chamber 10 will bring about a cycle of operations in which a state of equilibrium will ultimately be effected with the temperature of the bulb 11 at the ideal value, and the valve 12 in a relatively closed position.

It will further be apparent that as different settings of the desired temperature may be made by adjusting the position of the pointer 28, requiring that the indicator 15 be brought into agreement with it in order to establish equilibrium of the primary control, the bellows 33 will act to establish the position of the valve 34 to maintain the correct pressure upon the valve 12 as the bellows 22 returns to its one position of equilibrium.

If response of the bellows 33 were instantaneous upon change of pressure within the conduit 35, there would be set up an unstable condition, with a tendency toward oscillations; but the constricted section 41, in conjunction with the internal volume of the space supplied therethrough, introduces a characteristic time lag which effectually damps out undesirable fluctuations.

While a control embodying only the features set forth above provides a satisfactory performance so long as only moderate variations in demand for the heating agent are encountered, it is found that under conditions of extreme fluctuation the "reset" device as set forth above may have a tendency to defeat its ultimate purpose and introduce an undesirable condition of "hunting". This may be understood by examining the performance of the system in starting up from a cold condition, with the valves 38 and 39 still considered as resting in the positions shown in the drawings. With the bulb 11 "cold", the vane 24 will close the orifice member 19, building up a back-pressure in the bellows 22, and forcing the valve 34 to its upper seat, thus relieving all pressures in the conduit 35 and allowing the valve 12 to stand wide open. At the same time the bellows 33 will be collapsed, thus supplementing the tendency of the bellows 22 to hold the valve 34 in a closed position. In order to offset this effect and establish throttling action, it will be necessary for the temperature under control to rise well above the ideal value as established by the setting of the pointer 28 before the valve 34 will leave its seat and permit a working pressure to be built up in conduit 35. A similar action will take place if the temperature is allowed to rise to a limit where the valve 34 acts to close its vent and build up pressure in the conduit 35 to a value approximating that of the supply. Thus under wide fluctuations of the controlled magnitude, the "reset" feature may introduce conditions of extreme hunting.

The performance of the valves 38 and 39 under the conditions just exemplified is as follows: Assuming first the condition of cold starting, the pressure in the conduit 35 being substantially atmospheric, the bellows 37 will be collapsed, closing conduit 40 and admitting supply pressure to the bellows 33, thus tending to offset the action of bellows 22 to close valve 34 to the supply, and upon rising temperature to effect a premature opening of this valve, whereby throttling action in the valve 12 is established before the ideal value of temperature is reached. In a similar manner, upon cooling from an abnormally high temperature, or under any condition which may have carried the pressure in conduit 35 above the throttling range, the bellows 36 will act to lift valve 38 to its upper position, venting conduit 40 to the atmosphere and collapsing the bellows 33, so that as the throttling range is approached control will be established before the ideal temperature is actually reached; and, upon the pressure within the conduit 35 returning within the throttling range, the bellows 33 will resume its primary function of "resetting" the control point in accordance with the demand for the heating agent.

Thus it will be seen that by the superposition of an "anticipatory" feature upon a "resetting" feature, there is obtained a control characteristic which, while quick to correct for abnormal variations in the controlled magnitude, is able to maintain the corrected magnitude within a narrow operating range without instability or hunting.

In Fig. 2 is shown an alternative arrangement in which a similar performance is obtained through the compensating influence being applied directly to the differential lever mechanism of the double opposed orifice control means. To this end, the upper extremity of the differential lever member 50 is operatively connected with a Bourdon spring 51, which, through a conduit 52, is connected to the restricted portion 53 of the outlet of the valve 54. A Bourdon spring 55 controls the lever 50 through a connecting link 56, said spring being responsive to temperature variations to which the bulb 57 is exposed, as in the previously described embodiment. Adjustment of the setting of the control is effected by bodily shifting the orifice member 58 about the axis 59 through the agency of an extended arm 60 fixed thereto and connected by means of a link 61 to an extension of the setting pointer 62.

Operation of the normal uncompensated control is identical with that set forth in connection with the embodiment shown in Fig. 1, the variations in air pressure, as controlled by the position of vane 63, acting directly upon the valve 64 through the bellows 65. The "resetting" influence, while within the throttling range, is effected by the air pressure within the conduit 66 reacting through the valves 67 and 54 and the conduits 68 and 52, together with the constriction 53, upon the Bourdon spring 51, and thus upon the vane 63. Upon variations of the pressure within the conduit 66 above or below the throttling range, valve 54 or 67, as the case may be, will be actuated and the performance of the device reversed, as above set forth.

Figure 3:
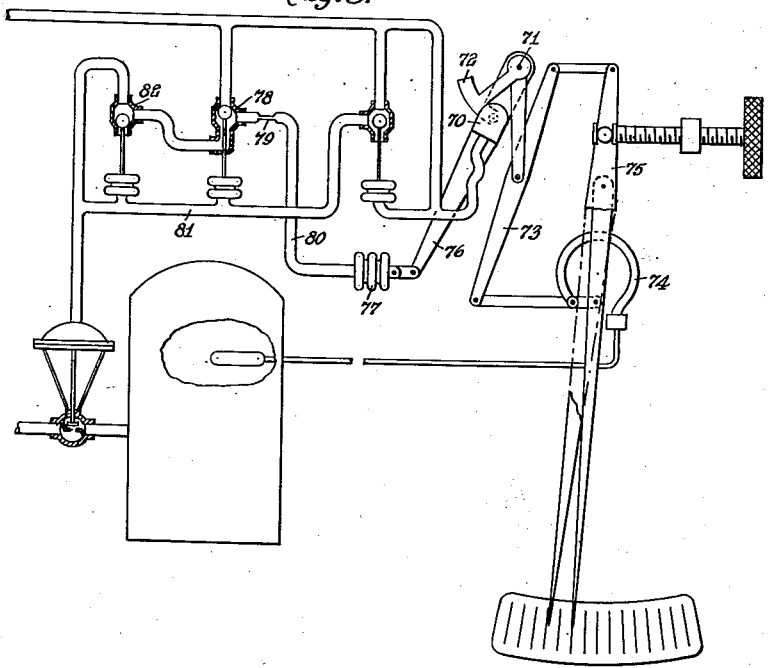
Fig. 3 is a further alternative form.

A further alternative arrangement is shown in Fig. 3, where a performance in all respects the equivalent of that hereinbefore set forth is obtained by applying the compensating influence to the orifice member. The latter, indicated at 70, to this end is made movable about the axis 71, the action of the vane 72 through the differential lever 73, subject jointly to the sensitive element or Bourdon spring 74 and the adjusting pointer 75, being identical with that shown in Fig. 1.

The said orifice member 70 carries an extended arm 76, which is operatively linked to a bellows member 77. This bellows is connected to the outlet side of the valve 78 through the constricted section 79 and a conduit 80. So long as the pressure within the conduit 81 remains within the "throttling range" its variations will react upon the bellows 77 and will shift the orifice member 70 in a sense to establish "resetting" action as hereinbefore set forth. Upon variations of the pressure above or below the throttling range, valve 78 or 82, as the case may be, will be actuated, and the performance reversed as in the previous instances.

In Fig. 4 is shown an arrangement wherein the reversing valves, corresponding to the valves 38 and 39 of the embodiment shown in Fig. 1, are electrically operated, control being obtained from a single pressure-responsive element. In the embodiment, solenoid-operated three-way valves 85 and 86 are connected as shown to communicate with the different conduits 87, 88, 89 and 90 which correspond respectively to the conduits 20, 35, 40 and the conduit having the constriction 41 of said previously described embodiment.

A fluid-pressure-responsive element, such, for example, as a Bourdon spring 91, is connected to the conduit 88, and carries a movable contact 92 adjusted to engage a stationary contact 93 when the internal pressure exceeds the throttling range, actuating the valve 85, and to engage a stationary contact 94 when the pressure falls below the "throttling range", actuating the valve 86. It will be seen that the actuation of these valves will produce results identical with the operation of the corresponding valves 38 and 39 in the embodiment above set forth, with identical effects on the performance of the control system.

A further alternative arrangement, embodying a single pneumatically operated valve element replacing the valves 38 and 39 of the embodiment shown in Fig. 1, and applicable to any of the three above-described embodiments, is shown in Fig. 5. This valve device comprises a body member 100 enclosing a plunger element 101, and it has formed in it a plurality of axially spaced ports 102, 103, 104 and 105, communicating respectively with the source of air supply 106, the conduit 107, the constricted section 108 and the atmosphere. A port 109 in the plunger places port 104 in communication with any one of the other three ports according to the position of the plunger. A pressure-responsive member, such as a bellows 110, subjected to the pressure in conduit 107, serves to actuate the piston 101 in opposition to the influence of a spring 111; and adjustment is made so that with pressure in the conduit 107 within the throttling range, the port 104 will communicate with port 103.

Upon a rise of pressure above the "throttling range" the plunger will be forced to a position where port 104 will be in communication with the atmosphere through port 105, while with a pressure in conduit 107 below the "throttling range", the supply pressure will be admitted directly through port 102 to port 104 and thence to the bellows system. It will be apparent that with this arrangement the performance of the compensating control will be substantially identical with that set forth as characterizing the previously described embodiments.

This type of valve device lends itself readily to manual control, if desired, as well as to control by the pressure of the fluid within the conduit 107. Thus, by connection to the plunger 101 of, for example, a lever 112 with fulcrum 113 movably attached to body member 100, the said plunger may be displaced axially to overcome the force normally exerted thereon, as for emergency operation.

We claim:

1. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude: of a secondary control mechanism associated with the primary control mechanism adapted to modify the performance of the latter in response to moderate variations of the pressure of the fluid in said conduit; and means to reverse automatically the performance of said secondary control mechanism in response to conditions in the control system.

2. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude: of a secondary control mechanism associated with the primary control mechanism adapted to modify the performance of the latter in response to moderate variations of the pressure of the fluid in said conduit; and fluid-pressure responsive means subject to the pressure of the fluid in said conduit adapted to reverse, in response to extreme variations of said pressure, the performance of said secondary control mechanism.

3. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude; of a secondary control mechanism including a part of said primary control mechanism, and an element subject to the pressure of the fluid in said conduit adapted to control the action of fluid from said source of fluid supply on said part of the primary control mechanism, thereby modifying the performance of said primary control mechanism in response to moderate variations of the pressure of the fluid in said conduit; and means subject to the pressure of the fluid in said conduit adapted to reverse, in response to extreme variations of said pressure, the performance of said secondary control mechanism.

4. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude; of a secondary control mechanism associated with the primary control mechanism adapted to modify the performance of the latter in response to moderate variations of the pressure of the fluid in said conduit; and valve means subject to the pressure of the fluid in said conduit to reverse, in response to extreme variations of said pressure, the performance of said secondary control mechanism.

5. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude; of a secondary control mechanism associated with the primary control mechanism adapted to modify the performance of the latter in response to moderate variations of the pressure of the fluid in said conduit; and fluid-operated valve means subject to the pressure of the fluid in said conduit adapted to vent said conduit and to control the supply of fluid thereto from said source of fluid supply and thereby to reverse, in response to extreme variations of the pressure of the fluid in said conduit, the performance of said secondary control mechanism.

6. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude; of a secondary control mechanism associated with the primary control mechanism adapted to modify the performance of the latter in response to moderate variations of the pressure of the fluid in said conduit; and electrically-operated valve means subject to the pressure of the fluid in said conduit to reverse, in response to extreme variations of said pressure, the performance of said secondary control mechanism.

7. In a control system including fluid-pressure actuated means for regulating a condition, a conduit adapted to supply fluid under pressure to said means for operating the same, and a source of expansible fluid supply: the combination with a primary control mechanism located between the fluid supply and the conduit to regulate the pressure of the fluid in said conduit in a sense to establish and maintain the control condition at a predetermined magnitude and including a valve of the supply-and-waste type subject jointly to the direct influence of said primary control mechanism and to a delayed action of the pressure of the fluid in said conduit, and normally in a sense that pressure changes of the fluid in said conduit due to action of said valve further actuates the same in a sense to accentuate said action so long as the said pressures lie within predetermined limits; and means, active only when the pressures of the fluid within said conduit exceed said limits and subject thereto, for reversing the sense of said delayed action on said valve.

8. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude; of a secondary control mechanism associated with the primary control mechanism adapted to modify the performance of the latter in response to moderate variations of the pressure of the fluid in said conduit; and a tertiary control mechanism adapted to modify the performance of said secondary control mechanism in response to variations of pressure in said conduit beyond said predetermined limits.

9. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude; of a secondary control mechanism associated with the primary control mechanism adapted to modify the performance of the latter in response to moderate variations of the pressure of the fluid in said conduit; and a tertiary control mechanism adapted to reverse the action of said secondary control mechanism in response to variations in pressure of the fluid in said conduit beyond said predetermined limits.

10. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude; of a secondary control mechanism associated with the primary control mechanism adapted to modify the performance of the latter in response to moderate variations of the pressure of the fluid in said conduit; and a tertiary control mechanism comprising bellows subject to the pressure of the fluid within said conduit, and a valve means actuated thereby adapted to control the supply thereto of fluid from said source of fluid supply and also to vent said conduit.

11. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude; of a secondary control mechanism associated with the primary control mechanism and comprising a bellows normally communicating with the said conduit and acting on the primary control mechanism to modify the performance of the latter in response to moderate variations of the pressure of the fluid in said conduit, a reservoir for the fluid communicating with said bellows and adapted to communicate through a constriction with the said conduit, and valve means included in the connection and controlled by the pressure of the fluid in said conduit.

12. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude, said primary control mechanism comprising a valve controlling the supply of the fluid to the conduit, a bellows acting upon said valve under the influence of the variable condition; of a secondary control mechanism associated with the primary control mechanism adapted to modify the performance of the latter in response to moderate variations of the pressure of the fluid in said conduit; and means subject to the pressure of the fluid in said conduit adapted to reverse, in response to extreme variations of said pressure, the performance of said secondary control mechanism.

13. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude, said primary control mechanism comprising a valve controlling the supply of the fluid to the conduit, a bellows acting upon said valve under the influence of the variable condition; of a secondary control mechanism comprising a second bellows normally communicating with said conduit, and means included in the primary control mechanism and actuated by the second bellows for modifying, in response to moderate variations of the pressure of the fluid in said conduit, the performance of said primary control mechanism; and means subject to the pressure of the fluid in said conduit adapted to reverse, in response to extreme variations of said pressure, the performance of said secondary control mechanism.

14. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude, said primary control mechanism comprising a valve controlling the supply of the fluid to the conduit, a bellows acting upon said valve under the influence of the variable condition; of a secondary control mechanism comprising a second bellows normally communicating with said conduit, and means actuated thereby for mechanically setting the primary control mechanism in response to moderate variations of the pressure of the fluid in said conduit; and means subject to the pressure of the fluid in said conduit adapted to reverse, in response to extreme variations of said pressure, the performance of said secondary control mechanism.

15. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude, said primary control mechanism comprising a valve controlling the supply of the fluid to the conduit, a bellows acting upon said valve under the influence of the variable condition; and a stationary element and an oscillatable element cooperating to control the pressure of the fluid upon said bellows; of a secondary control mechanism comprising a second bellows normally communicating with said conduit, and means actuated thereby for mechanically setting the stationary element of said primary control mechanism to modify the performance of said primary control in response to moderate variations of the pressure of the fluid in said conduit; and means subject to the pressure of the fluid in said conduit adapted to reverse, in response to extreme variations of said pressure, the performance of said secondary control mechanism.

16. In a control system including fluid-pressure actuated means for regulating a condition, a conduit adapted to supply fluid under pressure to said means for operating the same, and a source of expansible fluid supply: the combination with a primary control mechanism located between the fluid supply and the conduit tending to regulate the pressure of the fluid in said conduit in a sense to establish and maintain the controlled condition at a predetermined magnitude, said primary control mechanism comprising a valve controlling the supply of the fluid to the conduit, a bellows acting upon said valve under the influence of the variable condition; and a stationary element and an oscillatable element cooperating to control the pressure of the fluid upon said bellows; of a secondary control mechanism comprising a second bellows normally communicating with said conduit, and means actuated thereby for mechanically setting the oscillatable element of said primary control mechanism to modify the performance of said primary control in response to moderate variations of the pressure of the fluid in said conduit; and means subject to the pressure of the fluid in said conduit adapted to reverse, in response to extreme variations of said pressure, the performance of said secondary control mechanism.

OWEN C. ABBOTT.
FRED A. FAUST.